United States Patent
Bayersdorfer et al.

(10) Patent No.: US 8,732,609 B1
(45) Date of Patent: May 20, 2014

(54) METHOD AND SYSTEM FOR PROVIDING A VISUAL SCROLLBAR POSITION INDICATOR

(75) Inventors: Mitchell D. Bayersdorfer, Menlo Park, CA (US); George A. Hansen, Danville, CA (US)

(73) Assignee: Intuit Inc., Mountain View, CA (US)

( * ) Notice: Subject to any disclaimer, the term of this patent is extended or adjusted under 35 U.S.C. 154(b) by 552 days.

(21) Appl. No.: 12/906,787

(22) Filed: Oct. 18, 2010

(51) Int. Cl.
*G06F 3/048* (2013.01)

(52) U.S. Cl.
USPC .......................................................... 715/786

(58) Field of Classification Search
USPC .......................................................... 715/786
See application file for complete search history.

(56) References Cited

U.S. PATENT DOCUMENTS

| | | | |
|---|---|---|---|
| 5,515,497 A * | 5/1996 | Itri et al. | 715/776 |
| 2002/0049615 A1* | 4/2002 | Huber | 705/3 |
| 2004/0113952 A1 | 6/2004 | Randall | |
| 2004/0140984 A1 | 7/2004 | Hinckley et al. | |
| 2007/0150830 A1 | 6/2007 | Ording et al. | |
| 2008/0122796 A1* | 5/2008 | Jobs et al. | 345/173 |
| 2008/0180408 A1 | 7/2008 | Forstall et al. | |
| 2010/0017872 A1* | 1/2010 | Goertz et al. | 726/16 |
| 2010/0106615 A1* | 4/2010 | Chadwick et al. | 705/26 |
| 2011/0010656 A1* | 1/2011 | Mokotov | 715/780 |

OTHER PUBLICATIONS

Rowley et al., "Method and System for Providing an Intelligent Visual Scrollbar Position Indicator," U.S. Appl. No. 13/006,767, filed Jan. 14, 2011.

* cited by examiner

*Primary Examiner* — William Bashore
*Assistant Examiner* — Rayeez Chowdhury
(74) *Attorney, Agent, or Firm* — Hawley Troxell Ennis & Hawley LLP; Philip McKay (57) ABSTRACT

A system and method for providing a visual scrollbar position indicator whereby data included in a defined data field, or other data, associated with each entry in a list of entries is selected for display and as the list of entries is being scrolled through, the data included in the defined data field, or other data, associated with each entry in the list of entries selected for display is displayed to the user as each entry is passed, i.e., scrolled through, and as the scrolling is in progress, i.e., while the scrolling function is still activated.

19 Claims, 3 Drawing Sheets

|     | LAST NAME | FIRST NAME | CHECK # | DATE | △ |
|-----|-----------|------------|---------|------|---|
| 301A | MACDONALD | CHRIS | 11 075 | 10/1 | |
| 301B | MACMILLAN | DAVID | 11 000 | 10/1 | |
| 301C | MACINTOSH | IAN | 11 082 | 10/1 | |
| 301D | MCKAY | LYNETTE | 11 099 | 10/1 | |
| 301E | MCKAY | PHILIP | 11 076 | 10/1 | |
| 301F | MCKAY | SAVANNAH | 11 777 | 10/1 | |
| 301G | MICHAELS | JOHN | 11 323 | 10/1 | |
| 301H | MICKOLSON | JIM | 11 476 | 10/1 | |
| 301I | PETES | JOSE | 11 228 | 10/1 | |
| 301J | POLLOCK | CINDY | 11 444 | 10/1 | |

MCKAY, SAVANNAH

FIG. 3

METHOD AND SYSTEM FOR PROVIDING A VISUAL SCROLLBAR POSITION INDICATOR

BACKGROUND

One common way computing system implemented data management systems organize, and/or process/present, electronic data is to organize the data as a list of entries that include one or more data fields associated with each entry. For instance, a computing system implemented data management system, such as a computing system implemented payroll system, may organize employee pay records as lists of entries with each entry including multiple data entry fields such as name, pay rate, address, date, etc.

Using currently available computing system implemented data management systems, when a user desires to interact with a given entry, the user is presented the list of entries on a user interface display of a display device. Typically, this user interface display includes a scrollbar, or other similar mechanism, through which the user can scroll/move through the list of entries to find a desired entry.

Using currently available systems, the user activates the scrollbar, or other similar mechanism, using a user interface device by dragging, or otherwise activating a scroll bar "thumb." Using currently available systems, the scrollbar, or other similar mechanism, shows the user a visual representation of relative position of the scroll with respect to the entire list of entries via a scroll position symbol. For instance, a currently available scrollbar, or other similar mechanism, may use a scroll position symbol to show the user that the position of the scroll is some fraction, say ½, of the way down the list of entries. However, using currently available systems, in order to find out exactly where in the list of entries the scroll currently is, the user must stop the scroll, i.e., deactivate the scroll bar "thumb", and then look to see what record the scroll is on.

As an example, using a currently available scrollbar, or other similar mechanism, a user wishing to find a payroll record entry for "Savannah McKay" sorted alphabetically by last name may currently activate the scroll bar "thumb" until the scrollbar position symbol indicates the position of the scroll is about ½ of the way down the list of employee name entries. The user would then release or deactivate the scroll bar "thumb" and look to see what record the scroll is actually on. In this specific example, given that "M" is about ½ of the way through the alphabet, ½ way through the list would be a good guess. However, it is highly unlikely that the user will deactivate/stop/pause the scroll precisely on the record for Savannah McKay and, in many cases; the user may not even be close. For instance, in the specific case introduced above, the user's assumption that "M" equates to ½ of the way down the list of entries is only valid if there are roughly the same number of people having last names beginning with each letter of the alphabet. Consequently, using currently available systems, it is far more likely the user will have to stop the scroll, note where in the list of names the scroll is positioned, and then begin the scroll again to get closer to the "M" listings, and then repeat the process until the entry for Savannah McKay is finally reached.

Clearly, the situation described above associated with current scrolling systems is relatively inefficient and far from ideal in that, while the user is scrolling a list of entries, the user does not actually know what record the scroll is positioned on as the scrolling is taking place, i.e., the user is not shown the record at the scroll's current position before the user deactivates the scroll and stops the process.

SUMMARY

In accordance with one embodiment, a system and method for providing a visual scrollbar position indicator includes a process for providing a visual scrollbar position indicator whereby data included in a defined data field, or other data, associated with each entry in a list of entries is selected for display. In various embodiments, the data field is selected: automatically by the process for providing a visual scrollbar position indicator based on analysis by the process for providing a visual scrollbar position indicator; and/or semi-automatically by the process for providing a visual scrollbar position indicator based on analysis by the process for providing a visual scrollbar position indicator and user input; and/or based on user input alone. In one embodiment, as the list of entries is being scrolled through, the data included in the defined data field, or other data, associated with each entry in the list of entries selected for display is displayed to the user as each entry is passed, i.e., scrolled through, and as the scrolling is in progress, i.e., while the scrolling function is still activated.

Using the system and method for providing a visual scrollbar position indicator discussed herein, while the user is scrolling a list of entries, the user is provided a visual indication of what record the scroll is currently positioned on; as the scrolling is taking place, i.e., the user is shown the record at the scroll's current position before the user deactivates the scroll and stops the scanning process.

Consequently, using the system and method for providing a visual scrollbar position indicator discussed herein, it is far less likely the user will have to stop the scroll, note where in the list of entries the scroll is positioned, and then begin the scroll again to get closer to desired entry. Therefore, the system and method for providing a visual scrollbar position indicator discussed herein is more efficient and effective than existing systems.

In addition, as discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, data included in a defined data field is selected for display. For instance, in one embodiment, a first data field is selected for display from two or more data fields that make up each data entry in a list of data entries.

In one embodiment, the first data field is selected automatically by the process for providing a visual scrollbar position indicator based on analysis by the process for providing a visual scrollbar position indicator such as what type of data is being viewed, historical actions taken by the user and/or one or more other selection parameters.

In one embodiment, the first data field is selected semi-automatically by the process for providing a visual scrollbar position indicator based on analysis by the process for providing a visual scrollbar position indicator and user input.

In one embodiment, the first data field is selected based on user input alone.

As one specific example, in one embodiment, the selected first data field is the same data field selected as a primary sort field for determining a listing order of the data entries. As a specific example, a given set of data entries may be sorted alphabetically by last name and the last name field may be selected as the primary sort field for the data entries. In one embodiment, the data in the last name field is also selected as the display data.

In various embodiments, a second data field is selected for display from two or more data fields that make up each data entry in the list of data entries.

In one embodiment, the second data field is selected automatically by the process for providing a visual scrollbar position indicator based on analysis by the process for providing a visual scrollbar position indicator such as what type of data is being viewed, historical actions taken by the user and/or one or more other selection parameters.

In one embodiment, the second data field is selected semi-automatically by the process for providing a visual scrollbar position indicator based on analysis by the process for providing a visual scrollbar position indicator and user input.

In one embodiment, the second data field is selected based on user input alone.

As one specific example, in one embodiment, the selected second data field is the same data field selected as a secondary sort field for determining a listing order of the data entries. As a specific example, a given set of data entries may be sorted alphabetically by last name and then by first name for identical last name entries. In this instance, the last name field may be selected as the primary sort field for the data entries and the first name field may be selected as the secondary sort field for the data entries. In one embodiment, the data in the last name and the first name fields is then also selected as the display data.

In other embodiments, any one or more data fields are selected for display from two or more data fields that make up each data entry in the list of data entries. In various embodiments, the selection of data fields for display is made automatically by the process for providing a visual scrollbar position indicator based on analysis by the process for providing a visual scrollbar position indicator such as what type of data is being viewed, historical actions taken by the user and/or one or more other selection parameters.

In various embodiments, the selection of data fields for display is made semi-automatically by the process for providing a visual scrollbar position indicator based on analysis by the process for providing a visual scrollbar position indicator and user input.

In various embodiments, the selection of data fields for display is made based on user input alone.

In various embodiments other data is associated with each entry in a list of entries and is selected for display. The other data can include, but is not limited to, any one of: color coding data based on data in one or more defined data fields; symbols based on data in one or more defined data fields; audio tones based on data in one or more defined data fields; or any other visual, or audio, representation scheme based on data in one or more defined data fields.

In various embodiments, the selection of other data for display is made automatically by the process for providing a visual scrollbar position indicator based on analysis by the process for providing a visual scrollbar position indicator such as what type of data is being viewed, historical actions taken by the user and/or one or more other selection parameters.

In various embodiments, the selection of other data for display is made semi-automatically by the process for providing a visual scrollbar position indicator based on analysis by the process for providing a visual scrollbar position indicator and user input.

In various embodiments, the selection of other data for display is made based on user input alone.

In one embodiment, the data entries are displayed to a user via a user interface screen displayed on a display device of a computing system associated with, and/or accessible by, the user. In one embodiment, the data entries are displayed to the user as the list of entries and the user is provided with a scrolling display, icon, symbol, or similar function, that is capable of being activated by the user, in one embodiment via a user interface device such as, but not limited to, a mouse, a keyboard, a touchpad, a voice recognition system, or any other device and/or process for converting user actions into computer readable instructions/commands.

In one embodiment, once the user activates the scrolling symbol, the list of data entries is scrolled through and, as the list of data entries is being scrolled through, the data included in the selected display data fields, or other data, associated with each entry in the list of entries is displayed to the user as each entry is passed, i.e., as each entry is scrolled through, and as the scrolling is in progress while the scrolling function is still activated.

In one embodiment, the data included in the selected display data fields, or other data, associated with each entry in the list of entries is displayed as text in a text window or other display associated with the scrolling symbol and displayed on the same display screen as the listing of data entries and the scrolling symbol.

In one embodiment, the data included in the selected display data fields, or other data, associated with each entry in the list of entries is displayed as a replacement symbol for the scrolling symbol.

In one embodiment, the data included in the selected display data fields, or other data, associated with each entry in the list of entries is displayed in a separate section, or window, of the display screen that includes the listing of data entries and the scrolling symbol.

Hardware System Architecture

Figure 1:
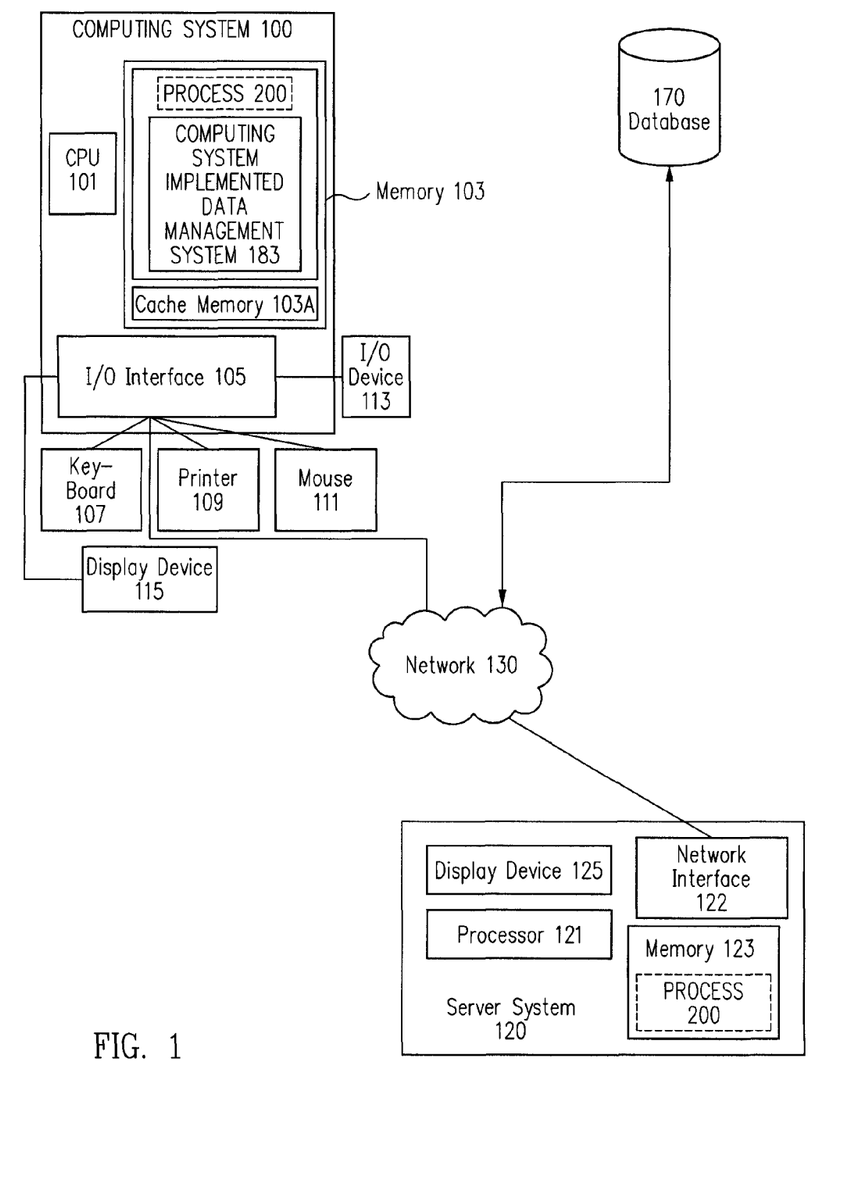
FIG. 1 is a block diagram of an exemplary hardware architecture for implementing one embodiment.

FIG. 1 is a block diagram of an exemplary hardware architecture for implementing one embodiment of a system and method for providing a visual scrollbar position, such as exemplary process 200 discussed herein, that includes: a computing system 100; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a process for providing a visual scrollbar position, such as exemplary process 200 discussed below. As also seen in FIG. 1, computing system 100 includes computing system implemented data management system 183. In one embodiment, computing system implemented data management system 183 represents any one or more computing system implemented data management systems such as, but is not limited to: computing system implemented accounting and/or invoicing systems, packages, programs, modules, or applications; personal financial management systems, packages, programs, modules, or applications; business financial management systems, packages, programs, modules, or applications; computing system implemented banking systems, packages, programs, modules, or applications; computing system implemented general business systems, packages, programs, modules, or applications; computing system implemented marketing device distribution systems, packages, programs, modules, or applications; computing system implemented tax preparation systems, packages, programs, modules, or applications; computing system implemented point of sale systems, packages, programs, modules, or applications; computing system implemented healthcare management systems, packages, programs, modules, or applications; and various other electronic data driven data management systems, packages, programs, modules, or applications, whether known at the time of filling or as developed later.

As used herein, the term "computing system implemented financial management system" includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed.

As discussed in more detail below, in one embodiment, process for providing a visual scrollbar position 200 and/or computing system implemented data management system 183 are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 is a computing system used and/or accessible by another computing system, Internet appliance, any other device, or any desired combination of devices, that includes components that can execute all, or part, of process for providing a visual scrollbar position 200, in accordance with at least one of the embodiments as described herein.

Also shown in FIG. 1 is exemplary database 170. In one embodiment, database 170 is any data storage device, a designated server system or computing system, or a designated portion of one or more server systems or computing systems, such as computing system 100, and/or server system 120, or a distributed database, or an external and/or portable hard drive. In one embodiment, database 170 is a dedicated mass storage device implemented in software, hardware, or a combination of hardware and software. In one embodiment, database 170 is a web-based function.

In one embodiment, database 170 is under the control of a process for providing a visual scrollbar position, such as exemplary process 200, and/or a computing system implemented process, such as computing system implemented data management system 183.

In one embodiment, computing system 100 and database 170 are coupled to a server system 120 through network 130. In one embodiment, server system 120 typically includes a server system display device 125, a server system processor 121, a server system memory 123, and a server system network interface 122.

In one embodiment, server system 120 is used, at least in part, as an exchange server, and/or as an e-mail server. In one embodiment, server system 120 is used in a station-to-station arrangement, such as a peer-to-peer, or hybrid peer-to peer, arrangement, as an indexing and/or central server used to connect a first computing system, such as computing system 100, and a second computing system.

In one embodiment, server system 120 includes all, or part of, a process for providing a visual scrollbar position, such as exemplary process 200 discussed below.

In one embodiment, server system 120 is used, controlled, and/or accessible by, a provider of a system and process for providing a visual scrollbar position, and/or a system and process for providing a visual scrollbar position, such as process for providing a visual scrollbar position 200.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or any other wireless, wired, and/or a wireless and wired combination networks capable of allowing communication between two or more computing systems, whether available or known at the time of filing or as later developed.

In one embodiment, all, or part, of computing system 100, database 170, server system 120 and/or network 130, and any associated functions and applications, are part of a cloud computing environment.

Those of skill in the art will readily recognize that the components shown in FIG. 1, such as computing system 100, database 170, server system 120, and their respective components, are shown for illustrative purposes only and that architectures with more or fewer components can implement, and benefit from, the invention. Moreover, one or more components of computing system 100, database 170, and server system 120 may be located remotely from their respective system and accessed via network, as discussed herein. In addition, the particular type of, and configuration of, computing system 100, database 170, and server system 120 are not relevant.

As discussed in more detail below, in one embodiment, a process for providing a visual scrollbar position, such as process for providing a visual scrollbar position 200, and/or a computing system implemented data management system, such as computing system implemented data management system 183, are stored, in whole, or in part, in memory system 103 and/or cache memory 103A, of computing system 100, and/or in server memory system 123 of server system 120 and/or in database 170, and executed on computing system 100. As used herein, a memory refers to a volatile memory, a non-volatile memory, or any combination of the two.

In one embodiment, a process for providing a visual scrollbar position, such as process for providing a visual scrollbar position 200, and/or a computing system implemented data management system, such as computing system implemented data management system 183, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and data transmitted over a network, such as network 130 of FIG. 1, or other media or process capable of delivering computer readable data representing computer readable code, whether available or known at the time of filing or as later developed. This medium may belong to a computing system, such as computing system 100 of FIG. 1, described above. However, in some embodiments, the medium also may be removable and/or remote from the computing system.

For example, all, or part, of a process for providing a visual scrollbar position, such as process for providing a visual scrollbar position 200, and/or a computing system implemented data management system, such as computing system implemented data management system 183, may be stored in a memory that is physically located in a location, such as server system memory 123, or database 170, of FIG. 1, different from a computing system, such as computing system 100, utilizing a process for providing a visual scrollbar position, such as process for providing a visual scrollbar position 200, and/or a computing system implemented data management system, such as computing system implemented data management system 183. In one embodiment, all, or part, of a process for providing a visual scrollbar position, such as process for providing a visual scrollbar position 200, and/or a computing system implemented data management system, such as computing system implemented data management system 183, may be stored in a memory that is physically located, separate from the computing system's processor(s), such as CPU 101 of FIG. 1, and the computing system CPUs can be coupled to the memory in a client-server system, such as server system 120 of FIG. 1, or, alternatively, via connection to another computer, such as computing system 100, via modems and analog lines, digital interfaces and a digital carrier line, or wireless or cellular connections.

In one embodiment, the computing systems and/or server systems, such as computing system 100 and/or server system 120 of FIG. 1, running and/or utilizing and/or storing all, or part, of a process for providing a visual scrollbar position, such as process for providing a visual scrollbar position 200, and/or a computing system implemented data management system, such as computing system implemented data management system 183, is a portable computer, a workstation, a two-way pager, a cellular telephone, a smart phone, a digital wireless telephone, a PDA, a server computer, an Internet appliance, or any other device that includes components that can execute all, or part, of a process for providing a visual scrollbar position, such as process for providing a visual scrollbar position 200, and/or a computing system implemented data management system, such as computing system implemented data management system 183, in accordance with at least one of the embodiments as described herein. Similarly, in another embodiment, a process for providing a visual scrollbar position, such as process for providing a visual scrollbar position 200, and/or a computing system implemented data management system, such as computing system implemented data management system 183, may be implemented on, and/or run on/by, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "user", "consumer", "individual", are used interchangeably to denote any party interfacing and/or interacting with a process for providing a visual scrollbar position, and/or an authorized agent of any party interfacing and/or interacting with a process for providing a visual scrollbar position, and/or any other authorized party associated with any party interfacing and/or interacting with a process for providing a visual scrollbar position.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; personal financial management systems, packages, programs, modules, or applications; business financial management systems, packages, programs, modules, or applications; computing system implemented banking systems, packages, programs, modules, or applications; computing system implemented small business financial management systems, packages, programs, modules, or applications; computing system implemented general business systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "computing system implemented financial management system" includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filing or as developed later.

As used herein, the term "network" includes, but is not limited to, any network or network system such as, but not limited to, any one or more of the following, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to, any one or more of the following: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a system and method for providing a visual scrollbar position indicator includes a process for providing a visual scrollbar position indicator whereby data included in a defined data field, or other data, associated with each entry in a list of entries is selected for display. In various embodiments, the data field is selected: automatically by the process for providing a visual scrollbar position indicator based on analysis by the process for providing a visual scrollbar position indicator; and/or semi-automatically by the process for providing a visual scrollbar position indicator based on analysis by the process for providing a visual scrollbar position indicator and user input; and/or based on user input alone. In one embodiment, as the list of entries is being scrolled through, the data included in the defined data field, or other data, associated with each entry in the list of entries selected for display is displayed to the user as each entry is passed, i.e., scrolled through, and as the scrolling is in progress, i.e., while the scrolling function is still activated.

Figure 2:
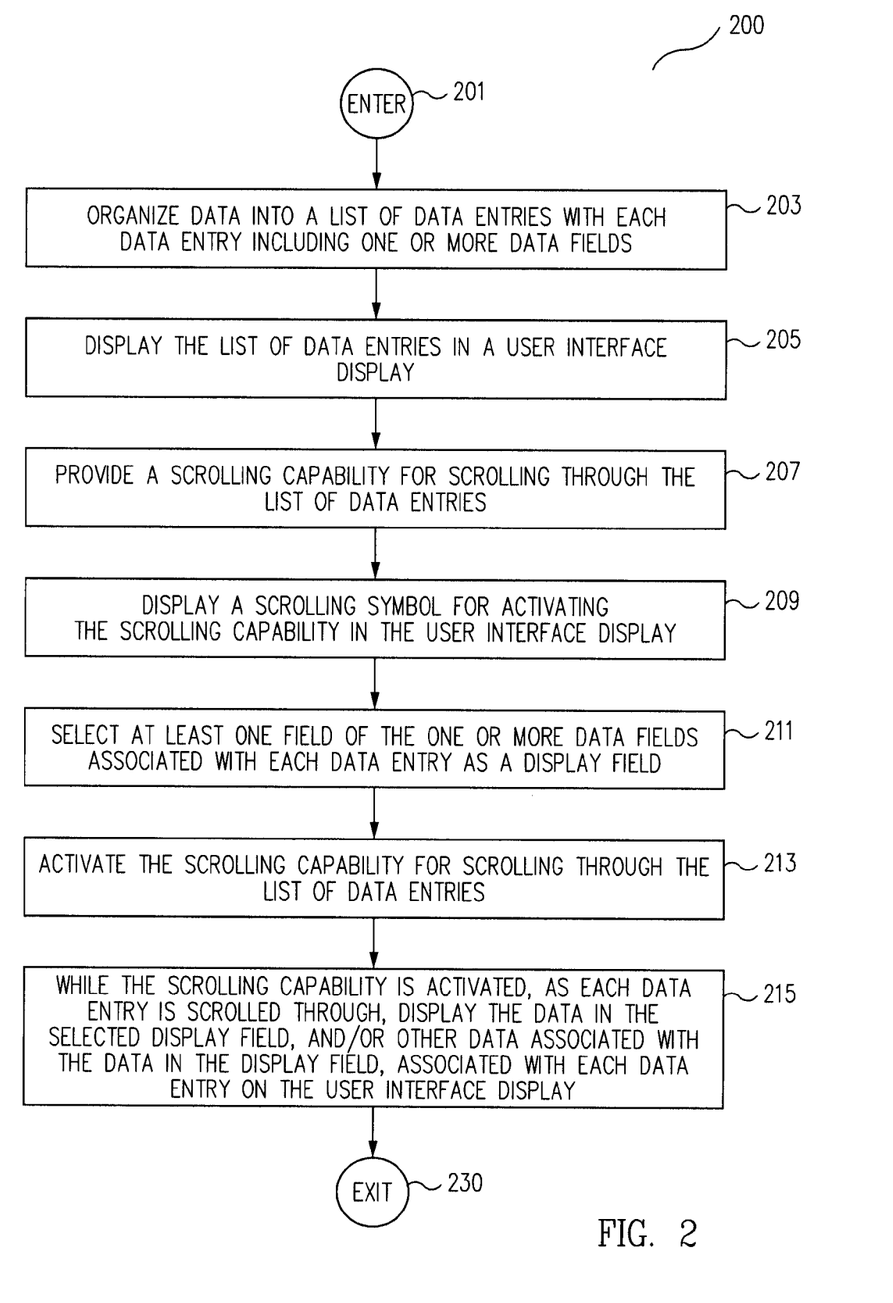
FIG. 2 is a flow chart depicting a process for providing a visual scrollbar position in accordance with one embodiment.

FIG. 2 a flow chart depicting a process for providing a visual scrollbar position 200 in accordance with one embodiment. Process for providing a visual scrollbar position 200 begins at ENTER OPERATION 201 of FIG. 2 and process flow proceeds to ORGANIZE DATA INTO A LIST OF DATA ENTRIES WITH EACH DATA ENTRY INCLUDING ONE OR MORE DATA FIELDS OPERATION 203.

In one embodiment, at ORGANIZE DATA INTO A LIST OF DATA ENTRIES WITH EACH DATA ENTRY INCLUDING ONE OR MORE DATA FIELDS OPERATION 203 data is organized into data entries with each data entry including at least one data entry field and the data entries are arranged in a listing of the data entries.

In one embodiment, at ORGANIZE DATA INTO A LIST OF DATA ENTRIES WITH EACH DATA ENTRY INCLUDING ONE OR MORE DATA FIELDS OPERATION 203 data is organized into data entries with each data entry including at least one data entry field and the data entries are arranged in a listing of the data entries by one or more processors, such as CPU 101, and/or processor 121, of FIG. 1, associated with one or more computing systems, such as computing system 100 and/or server system 120, of FIG. 1.

Returning to FIG. 2, in one embodiment, at ORGANIZE DATA INTO A LIST OF DATA ENTRIES WITH EACH DATA ENTRY INCLUDING ONE OR MORE DATA FIELDS OPERATION 203 data is organized into data entries with each data entry including at least one data entry field and the data entries are arranged in a listing of the data entries by a computing system implemented data management system, such as computing system implemented data management system 183 of FIG. 1, or any computing system implemented data management system as discussed herein, and/or as known in the art at the time of filing, and/or as developed after the time of filing.

Arrangements of data into data entries with each data entry including at least one data entry field are well known in the art. In addition, in various data arrangements large lists of data entries are assigned a "sort order" or "sort field" which indicates which column, or data field, is used to sort the data entries. In many cases there is a primary and secondary sort field whereby the primary sort is the first field sorted and the secondary sort is used when the primary fields of multiple data entries are identical.

For example, as a specific example, a given set of data entries may be sorted alphabetically by last name and the last name field may be selected as the primary sort field for the data entries. In addition, a given set of data entries may be sorted alphabetically by last name and then by first name for identical last name entries. In this instance, the last name field may be selected as the primary sort field for the data entries and the first name field may be selected as the secondary sort field for the data entries.

Returning to FIG. 2, in one embodiment, once data is organized into data entries with each data entry including at least one data entry field and the data entries are arranged in a listing of the data entries at ORGANIZE DATA INTO A LIST OF DATA ENTRIES WITH EACH DATA ENTRY INCLUDING ONE OR MORE DATA FIELDS OPERATION 203, process flow proceeds to DISPLAY THE LIST OF DATA ENTRIES IN A USER INTERFACE DISPLAY OPERATION 205.

In one embodiment, at DISPLAY THE LIST OF DATA ENTRIES IN A USER INTERFACE DISPLAY OPERATION 205 the listing of the data entries of ORGANIZE DATA INTO A LIST OF DATA ENTRIES WITH EACH DATA ENTRY INCLUDING ONE OR MORE DATA FIELDS OPERATION 203 is displayed in a user interface display displayed on a display device of a computing system accessible by a user.

In one embodiment, at DISPLAY THE LIST OF DATA ENTRIES IN A USER INTERFACE DISPLAY OPERATION 205 the listing of the data entries of ORGANIZE DATA INTO A LIST OF DATA ENTRIES WITH EACH DATA ENTRY INCLUDING ONE OR MORE DATA FIELDS OPERATION 203 is displayed in a user interface display displayed on a display device, such as display device 115 of FIG. 1, of a computing system, such as computing system 100 of FIG. 1.

Returning to FIG. 2, in one embodiment, at DISPLAY THE LIST OF DATA ENTRIES IN A USER INTERFACE DISPLAY OPERATION 205 the listing of the data entries of ORGANIZE DATA INTO A LIST OF DATA ENTRIES WITH EACH DATA ENTRY INCLUDING ONE OR MORE DATA FIELDS OPERATION 203 is displayed in a user interface display displayed on a display device of a computing system accessible by a user under the direction of one or more processors, such as CPU 101, and/or processor 121, of FIG. 1, associated with one or more computing systems, such as computing system 100 and/or server system 120, of FIG. 1.

Figure 3:
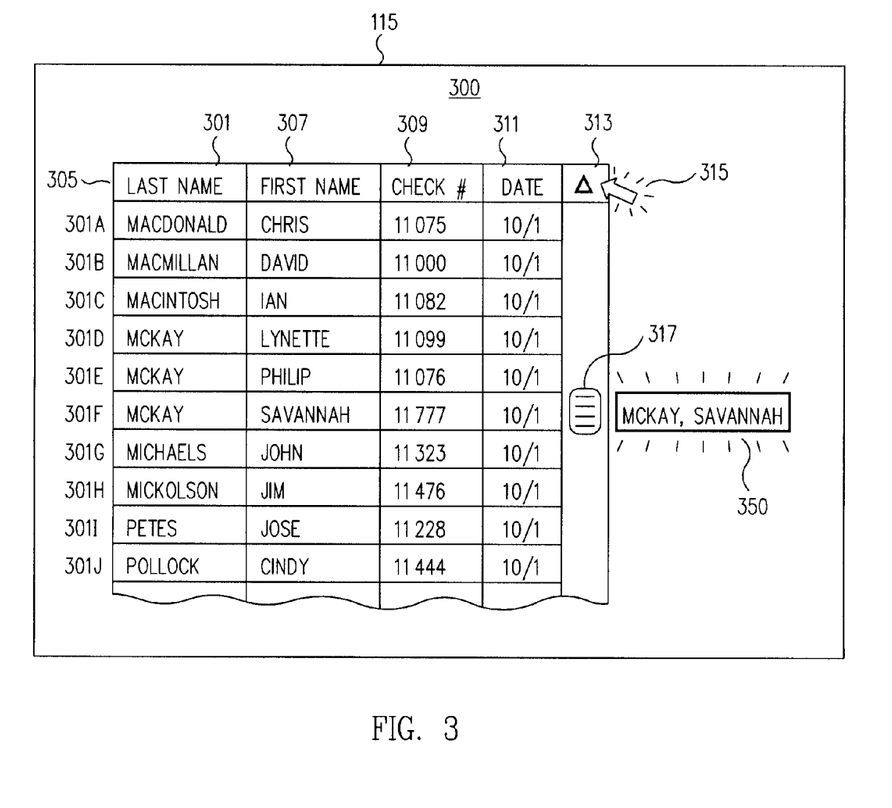
FIG. 3 is one specific example a user interface display generated in accordance with one embodiment and including one example of one embodiment of a visual scrollbar position indicator/symbol.

FIG. 3 shows one specific example of a user interface display 300 displayed on a display device 115 generated in accordance with one embodiment and including one example of one embodiment of a listing of data entries 301. As shown in FIG. 3, listing of data entries 301 includes multiple data entries 301A to 301J with each data entry including four data entry fields 305 (last name), 307 (first name), 309 (check number), and 311 (date).

As also seen in FIG. 3, data entries 301A to 301J are sorted by last name, i.e., according to data in a designated primary sort field, data entry field 305 (last name), alphabetically and, for instances of identical primary sort field data, such as data entries 301D, 301E, and 301F, according to data in a designated secondary sort field, data entry field 307 (first name). That is to say, data entries 301A to 301J are sorted alphabetically using data field 305 (last name) as a primary sort field and data field 307 (first name) as a secondary sort field.

Returning to FIG. 2, in one embodiment, once the listing of the data entries of ORGANIZE DATA INTO A LIST OF DATA ENTRIES WITH EACH DATA ENTRY INCLUDING ONE OR MORE DATA FIELDS OPERATION 203 is displayed in a user interface display displayed on a display device of a computing system accessible by a user at DISPLAY THE LIST OF DATA ENTRIES IN A USER INTERFACE DISPLAY OPERATION 205, process flow proceeds to PROVIDE A SCROLLING CAPABILITY FOR SCROLLING THROUGH THE LIST OF DATA ENTRIES OPERATION 207.

In one embodiment, at PROVIDE A SCROLLING CAPABILITY FOR SCROLLING THROUGH THE LIST OF DATA ENTRIES OPERATION 207 a scrolling capability is provided whereby a user can scroll through the listing of the data entries of ORGANIZE DATA INTO A LIST OF DATA ENTRIES WITH EACH DATA ENTRY INCLUDING ONE OR MORE DATA FIELDS OPERATION 203 displayed at DISPLAY THE LIST OF DATA ENTRIES IN A USER INTERFACE DISPLAY OPERATION 205.

Methods, means, mechanisms, processes, and procedures for providing scrolling capabilities are well known in the art. Consequently, a more detailed discussion of specific methods, means, mechanisms, processes, and procedures for providing scrolling capabilities is omitted here in order to avoid detracting from the description.

In one embodiment, once a scrolling capability is provided whereby a user can scroll through the listing of the data entries of ORGANIZE DATA INTO A LIST OF DATA ENTRIES WITH EACH DATA ENTRY INCLUDING ONE OR MORE DATA FIELDS OPERATION 203 displayed at DISPLAY THE LIST OF DATA ENTRIES IN A USER INTERFACE DISPLAY OPERATION 205 at PROVIDE A SCROLLING CAPABILITY FOR SCROLLING THROUGH THE LIST OF DATA ENTRIES OPERATION 207, process flow proceeds to DISPLAY A SCROLLING SYMBOL FOR ACTIVATING THE SCROLLING CAPABILITY IN THE USER INTERFACE DISPLAY OPERATION 209.

In one embodiment, at DISPLAY A SCROLLING SYMBOL FOR ACTIVATING THE SCROLLING CAPABILITY IN THE USER INTERFACE DISPLAY OPERATION 209 a scrolling display, icon, symbol, or similar function, which is capable of being activated by the user is provided.

In one embodiment, at DISPLAY A SCROLLING SYMBOL FOR ACTIVATING THE SCROLLING CAPABILITY IN THE USER INTERFACE DISPLAY OPERATION 209 the scrolling display, icon, symbol, or similar function, is capable of being activated by the user via a user interface device such as, but not limited to, a mouse, such as mouse 111 of FIG. 1, a keyboard, such as keyboard 107 of FIG. 1, a touchpad, a voice recognition system, or any other device and/or process for converting user actions into computer readable instructions/commands.

Returning to FIG. 2, in one embodiment, once the user activates the scrolling symbol, the list of data entries of DISPLAY THE LIST OF DATA ENTRIES IN A USER INTERFACE DISPLAY OPERATION 205 is scrolled through until the scrolling symbol is deactivated.

FIG. 3 shows a scrolling symbol 313 that is being activated by a cursor 315 that, in turn, is manipulated by a mouse (not shown) by a user. In this specific example, scrolling symbol 313 is a scrolling "thumb" that, when activated, scrolls through data entries 301A to 301J until released, i.e., deactivated, by the user by releasing a mouse button.

Also shown in FIG. 3 is traditional cursor position symbol 317 that gives a rough visual indication of the position of the scroll, but, in the prior art gave no indication of the specific data entry being scrolled through at any given time, or any data associated with the specific data entry being scrolled through at any given time.

In one embodiment, once a scrolling display, icon, symbol, or similar function, that is capable of being activated by the user is provided at DISPLAY A SCROLLING SYMBOL FOR ACTIVATING THE SCROLLING CAPABILITY IN THE USER INTERFACE DISPLAY OPERATION 209, process flow proceeds to SELECT AT LEAST ONE FIELD OF THE ONE OR MORE DATA FIELDS ASSOCIATED WITH EACH DATA ENTRY AS A DISPLAY FIELD OPERATION 211.

In one embodiment, at SELECT AT LEAST ONE FIELD OF THE ONE OR MORE DATA FIELDS ASSOCIATED WITH EACH DATA ENTRY AS A DISPLAY FIELD OPERATION 211 data included in a defined data field, or other data, associated with each data entry in the list of entries of ORGANIZE DATA INTO A LIST OF DATA ENTRIES WITH EACH DATA ENTRY INCLUDING ONE OR MORE DATA FIELDS OPERATION 203 is selected for display.

In one embodiment, at SELECT AT LEAST ONE FIELD OF THE ONE OR MORE DATA FIELDS ASSOCIATED WITH EACH DATA ENTRY AS A DISPLAY FIELD OPERATION 211 data included in a defined data field is selected for display. For instance, in one embodiment, a first data field is selected for display from two or more data fields that make up each data entry in a list of data entries.

In one embodiment, at SELECT AT LEAST ONE FIELD OF THE ONE OR MORE DATA FIELDS ASSOCIATED WITH EACH DATA ENTRY AS A DISPLAY FIELD OPERATION 211, the first data field is selected automatically by process for providing a visual scrollbar position indicator 200 based on analysis by process for providing a visual scrollbar position indicator 200 such as, but not limited to, what type of data is being viewed, historical actions taken by the user and/or one or more other selection parameters.

In one embodiment, at SELECT AT LEAST ONE FIELD OF THE ONE OR MORE DATA FIELDS ASSOCIATED WITH EACH DATA ENTRY AS A DISPLAY FIELD OPERATION 211, the first data field is selected semi-automatically by process for providing a visual scrollbar position indicator 200 based on analysis by the process for providing a visual scrollbar position indicator and user input.

In one embodiment, at SELECT AT LEAST ONE FIELD OF THE ONE OR MORE DATA FIELDS ASSOCIATED WITH EACH DATA ENTRY AS A DISPLAY FIELD OPERATION 211, the first data field is selected based on user input alone.

As one specific example, at SELECT AT LEAST ONE FIELD OF THE ONE OR MORE DATA FIELDS ASSOCIATED WITH EACH DATA ENTRY AS A DISPLAY FIELD OPERATION 211, the selected first data field is the same data field selected as a primary sort field for determining a listing order of the data entries. As a specific example, a given set of data entries may be sorted alphabetically by last name and the last name field may be selected as the primary sort field for the data entries. In one embodiment, the data in the last name field is also selected as the display data.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, a second data field is selected for display from two or more data fields that make up each data entry in the list of data entries.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the second data field is selected automatically by process for providing a visual scrollbar position indicator 200 based on analysis by process for providing a visual scrollbar position indicator 200 such as, but not limited to, what type of data is being viewed, historical actions taken by the user and/or one or more other selection parameters.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the second data field is selected semi-automatically by the process for providing a visual scrollbar position indicator based on analysis by the process for providing a visual scrollbar position indicator and user input.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the second data field is selected based on user input.

As one specific example, in one embodiment, at SELECT AT LEAST ONE FIELD OF THE ONE OR MORE DATA FIELDS ASSOCIATED WITH EACH DATA ENTRY AS A DISPLAY FIELD OPERATION 211, the selected second data field is the same data field selected as a secondary sort field for determining a listing order of the data entries. As a specific example, a given set of data entries may be sorted alphabetically by last name and then by first name for identical last name entries. In this instance, the last name field may be selected as the primary sort field for the data entries and the first name field may be selected as the secondary sort field for the data entries. In one embodiment, the data in the last name and the first name fields is then also selected as the display data.

In other embodiments, at SELECT AT LEAST ONE FIELD OF THE ONE OR MORE DATA FIELDS ASSOCIATED WITH EACH DATA ENTRY AS A DISPLAY FIELD OPERATION 211, any one or more data fields, and/or combination of data fields, are selected for display from two or more data fields that make up each data entry in the list of data entries.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the selection of any one or more data fields, and/or combination of data fields, for display is made automatically by process for providing a visual scrollbar position indicator 200 based on analysis by process for providing a visual scrollbar position indicator 200 such as what type of data is being viewed, historical actions taken by the user and/or one or more other selection parameters.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the selection of any one or more data fields, and/or combination of data fields, for display is made semi-automatically by process for providing a visual scrollbar position indicator 200 based on analysis by process for providing a visual scrollbar position indicator 200 and user input.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the selection of any one or more data fields, and/or combination of data fields, for display is made based on user input alone.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, the selection of data fields for display is made semi-automatically by process for providing a visual scrollbar position indicator 200 and is implemented with user review/approval.

In various embodiments, at SELECT AT LEAST ONE FIELD OF THE ONE OR MORE DATA FIELDS ASSOCIATED WITH EACH DATA ENTRY AS A DISPLAY FIELD OPERATION 211, other data is associated with each entry in the list of entries and is selected for display. The other data can include, but is not limited to, any one of: color coding data based on data in one or more defined data fields; symbols based on data in one or more defined data fields; audio tones based on data in one or more defined data fields; or virtually any other visual, or audio, representation scheme based on data in one or more defined data fields.

Returning to FIG. 3, as noted above, in this specific example, data entries 301A to 301J are sorted by last name, i.e., according to data in a designated primary sort field, data entry field 305 (last name), alphabetically and, for instances of identical primary sort field data, such as data entries 301D, 301E, and 301F, according to data in a designated secondary sort field, data entry field 307 (first name). That is to say, data entries 301A to 301J are sorted alphabetically using data field 305 (last name) as a primary sort field and data field 307 (first name) as a secondary sort field.

In addition, in this specific example, at SELECT AT LEAST ONE FIELD OF THE ONE OR MORE DATA FIELDS ASSOCIATED WITH EACH DATA ENTRY AS A DISPLAY FIELD OPERATION 211 (FIG. 2) data field 305 (last name), the primary sort field, and data field 307 (first name), the secondary sort field, are selected for display, i.e., are designated display fields whose data will be displayed as discussed below.

In one embodiment, once data included in a defined data field, or other data, associated with each data entry in the list of entries of ORGANIZE DATA INTO A LIST OF DATA ENTRIES WITH EACH DATA ENTRY INCLUDING ONE OR MORE DATA FIELDS OPERATION 203 is selected for display at SELECT AT LEAST ONE FIELD OF THE ONE OR MORE DATA FIELDS ASSOCIATED WITH EACH DATA ENTRY AS A DISPLAY FIELD OPERATION 211, process flow proceeds to ACTIVATE THE SCROLLING CAPABILITY FOR SCROLLING THROUGH THE LIST OF DATA ENTRIES OPERATION 213.

In one embodiment, at ACTIVATE THE SCROLLING CAPABILITY FOR SCROLLING THROUGH THE LIST OF DATA ENTRIES OPERATION 213 the user activates the scrolling capability of DISPLAY A SCROLLING SYMBOL FOR ACTIVATING THE SCROLLING CAPABILITY IN THE USER INTERFACE DISPLAY OPERATION 209.

As noted above, in one embodiment, at ACTIVATE THE SCROLLING CAPABILITY FOR SCROLLING THROUGH THE LIST OF DATA ENTRIES OPERATION 213 the user activates the scrolling capability of DISPLAY A SCROLLING SYMBOL FOR ACTIVATING THE SCROLLING CAPABILITY IN THE USER INTERFACE DISPLAY OPERATION 209 by activating a scrolling display, icon, symbol, or similar function, via a user interface device such as, but not limited to, a mouse, such as mouse 111 of FIG. 1, a keyboard, such as keyboard 107 of FIG. 1, a touchpad, a voice recognition system, or any other device and/or process for converting user actions into computer readable instructions/commands.

Returning to FIG. 2, as also noted above, in one embodiment, once the user activates the scrolling symbol, the list of data entries of DISPLAY THE LIST OF DATA ENTRIES IN A USER INTERFACE DISPLAY OPERATION 205 is scrolled through until the scrolling symbol is deactivated.

Returning to FIG. 3, recall FIG. 3 shows a scrolling symbol 313 that is being activated by a cursor 315 that, in turn, is manipulated by a mouse (not shown) by a user. In this specific example, scrolling symbol 313 is a scrolling "thumb" that, when activated, scrolls through data entries 301A to 301J until released, i.e., deactivated, by the user by releasing a mouse button.

As also discussed above, shown in FIG. 3 is traditional cursor position symbol 317 that gives a rough visual indication of the position of the scroll, but, in the prior art, gave no indication of the specific data entry being scrolled through at any given time, or any data associated with the specific data entry being scrolled through at any given time.

Returning to FIG. 2, in one embodiment, once the user activates the scrolling capability of DISPLAY A SCROLLING SYMBOL FOR ACTIVATING THE SCROLLING CAPABILITY IN THE USER INTERFACE DISPLAY OPERATION 209 at ACTIVATE THE SCROLLING CAPABILITY FOR SCROLLING THROUGH THE LIST OF DATA ENTRIES OPERATION 213, process flow proceeds to WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215.

In one embodiment, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215 as the list of data entries is being scrolled through, the data included in the defined display data field, or other data, associated with each entry in the list of entries selected for display of SELECT AT LEAST ONE FIELD OF THE ONE OR MORE DATA FIELDS ASSOCIATED WITH EACH DATA ENTRY AS A DISPLAY FIELD OPERATION 211 is displayed to the user as each entry is scrolled through, and as the scrolling is in progress, i.e., while the scrolling function is still activated at ACTIVATE THE SCROLLING CAPABILITY FOR SCROLLING THROUGH THE LIST OF DATA ENTRIES OPERATION 213.

In one embodiment, once the user activates the scrolling symbol at ACTIVATE THE SCROLLING CAPABILITY FOR SCROLLING THROUGH THE LIST OF DATA ENTRIES OPERATION 213, the list of data entries is scrolled through and as the list of data entries is being scrolled through, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215, the data included in the selected display data fields, or other data, associated with each entry in the list of entries of SELECT AT LEAST ONE FIELD OF THE ONE OR MORE DATA FIELDS ASSOCIATED WITH EACH DATA ENTRY AS A DISPLAY FIELD OPERATION 211 is displayed to the user as each entry is passed, i.e., as each entry is scrolled through, and as the scrolling is in progress, while the scrolling function is still activated.

In one embodiment, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215, the data included in the selected display data fields, or other data, associated with each entry in the list of entries is displayed as text in a text window or other display associated with the scrolling symbol and displayed on the same display screen as the listing of data entries and the scrolling symbol.

In one embodiment, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215, the data included in the selected display data fields, or other data, associated with each entry in the list of entries is displayed as a replacement symbol for the scrolling symbol.

In one embodiment, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215, the data included in the selected display data fields, or other data, associated with each entry in the list of entries is displayed in a separate section or window of the display screen that includes the listing of data entries and the scrolling symbol.

Returning to FIG. 3, display window 350 includes a display of the data in selected display field 305 (last name), i.e., the primary sort field, and a display of the data in selected display field 307 (first name), i.e., the secondary sort field, associated with data entry 301F as data entry 301F is scrolled through via the simultaneous activation of scroll activation symbol 313 by cursor 315 that is manipulated by a mouse button (not shown) depressed by the user. Then, in this embodiment, as data entry 301F is scrolled past and data entry 301G is scrolled through via the simultaneous activation of scroll activation symbol 313 by cursor 315, display window 350 includes a display of the data in selected display field 305 (last name), i.e., the primary sort field, and a display of the data in selected display field 307 (first name), i.e., the secondary sort field, associated with data entry 301G. In this embodiment, the process continues for each data entry of all the data entries in data entry listing 301 until the user deactivates scroll activation symbol 313 with cursor 315, i.e., the user releases the depressed mouse button.

Returning to FIG. 2, once as the list of data entries is being scrolled through, the data included in the defined data field, or other data, associated with each entry in the list of entries selected for display of SELECT AT LEAST ONE FIELD OF THE ONE OR MORE DATA FIELDS ASSOCIATED WITH EACH DATA ENTRY AS A DISPLAY FIELD OPERATION 211 is displayed to the user as each entry is scrolled through, and as the scrolling is in progress, at WHILE THE SCROLLING CAPABILITY IS ACTIVATED, AS EACH DATA ENTRY IS SCROLLED THROUGH, DISPLAY THE DATA IN THE SELECTED DISPLAY FIELD, AND/OR DATA ASSOCIATED WITH THE DATA IN THE DISPLAY FIELD, ASSOCIATED WITH EACH DATA ENTRY ON THE USER INTERFACE DISPLAY OPERATION 215, i.e., the user deactivates the scrolling capability, process flow proceeds to EXIT OPERATION 230.

In one embodiment, at EXIT OPERATION 230, process for providing a visual scrollbar position 200 is exited to await a scroll activation.

Using process for providing a visual scrollbar position indicator 200, while the user is scrolling a list of entries, the user is provided a visual indication of what record the scroll is currently positioned on, as the scrolling is taking place, i.e., the user is shown the record at the scroll's current position before the user deactivates the scroll and stops the process.

Consequently, using process for providing a visual scrollbar position indicator 200, it is far less likely the user will have to stop the scroll, note where in the list of entries the scroll is positioned, and then begin the scroll again to get closer to desired entry. Therefore, process for providing a visual scrollbar position indicator 200 is more efficient and effective than existing systems.

As discussed in more detail above, using the above embodiments, with little or no modification and/or consumer input, there is considerable flexibility, adaptability, and opportunity for customization to meet the specific needs of various consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "organizing", "displaying", "activating", "selecting", "obtaining", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing a visual scrollbar position comprising:
using one or more processors associated with one or more computing systems to implement at least part of a computing system implemented data management system;
using the computing system implemented data management system to organize data into a list of data entries such that each data entry in the list of data entries includes at least two data fields containing data, the at least two data fields respectively including one or more data fields including color coding data based on the data in one or more of the at least two data fields, and audio tones data based on the data in one or more of the at least two data fields;
using one or more processors associated with one or more computing systems to display the list of data entries in a user interface display displayed on a display device associated with a computing system;
using one or more processors associated with one or more computing systems to generate and provide a scrolling capability whereby a user can scroll through the list of data entries displayed in the user interface display;
using one or more processors associated with one or more computing systems to generate and display a scrolling symbol for activation of the scrolling capability, the scrolling symbol being displayed in the user interface display;
selecting, through a combination of analysis by the process and also interactions by a party through a user interface, from the display of the list of data entries, one or more of the at least two data fields of each data entry in the list of data entries as a display data field, the selected display data fields at least including a data field having at least one of color coding data and audio tones data, wherein the analysis by the process selects a display data field at least partly based on the type of data in the at least two display fields;
using a user interface device to activate the scrolling capability via the scrolling symbol; and
while the scrolling capability is activated, using one or more processors associated with one or more computing systems to display, in the user interface display, the data in the selected data field of each data entry in the list of data entries as each data entry in the list of data entries is scrolled through and the scroll is positioned on the data entry.

2. The computing system implemented process for providing a visual scrollbar position of claim 1, wherein;
the computing system implemented data management system is a computing system implemented financial management system.

3. The computing system implemented process for providing a visual scrollbar position of claim 1, wherein;
the computing system implemented data management system organizes data into a list of data entries such that each data entry in the list of data entries includes a primary sort data field containing primary sort data and the primary sort data field is selected as a display data field.

4. The computing system implemented process for providing a visual scrollbar position of claim 1, wherein;
the computing system implemented data management system organizes data into a list of data entries such that each data entry in the list of data entries includes a primary sort data field containing primary sort data and a secondary sort data field containing secondary sort data and the primary sort data field and secondary sort data field are selected as display data fields.

5. The computing system implemented process for providing a visual scrollbar position of claim 1, wherein;
while the scrolling capability is activated, the data in the selected data field of each data entry in the list of data entries is displayed in a display window associated with the scrolling symbol as each data entry in the list of data entries is scrolled through and the scroll is positioned on the data entry.

6. The computing system implemented process for providing a visual scrollbar position of claim 1, wherein;

while the scrolling capability is activated, the data in the selected data field of each data entry in the list of data entries is displayed as a display symbol replacing the scrolling symbol as each data entry in the list of data entries is scrolled through and the scroll is positioned on the data entry.

7. A method for providing a visual scrollbar position comprising:

using a computing system implemented data management system to organize data into a list of data entries such that each data entry in the list of data entries includes at least two data fields containing data, the at least two data fields respectively including one or more data fields including color coding data based on the data in one or more of the at least two data fields, and audio tones data based on the data in one or more of the at least two data fields;

displaying the list of data entries in a user interface display displayed on a display device associated with a computing system;

providing a scrolling capability whereby a user can scroll through the list of data entries displayed in the user interface display;

displaying a scrolling symbol for activation of the scrolling capability, the scrolling symbol being displayed in the user interface display;

selecting, through a combination of analysis by the process and also interactions by a party through a user interface, from the display of the list of data entries, one or more of the at least two data fields of each data entry in the list of data entries as a display data field, the selected display data fields at least including a data field having at least one of color coding data and audio tones data, wherein the analysis by the process selects a display data field at least partly based on the type of data in the at least two display fields;

activating the scrolling capability via the scrolling symbol; and while the scrolling capability is activated, displaying, in the user interface display, the data in the selected data field of each data entry in the list of data entries as each data entry in the list of data entries is scrolled through and the scroll is positioned on the data entry.

8. The method for providing a visual scrollbar position of claim 7, wherein;

the computing system implemented data management system is a computing system implemented financial management system.

9. The method for providing a visual scrollbar position of claim 7, wherein;

the computing system implemented data management system organizes data into a list of data entries such that each data entry in the list of data entries includes a primary sort data field containing primary sort data and the primary sort data field is selected as a display data field.

10. The method for providing a visual scrollbar position of claim 7, wherein;

the computing system implemented data management system organizes data into a list of data entries such that each data entry in the list of data entries includes a primary sort data field containing primary sort data and a secondary sort data field containing secondary sort data and the primary sort data field and secondary sort data field are selected as display data fields.

11. The method for providing a visual scrollbar position of claim 7, wherein;

while the scrolling capability is activated, the data in the selected data field of each data entry in the list of data entries is displayed in a display window associated with the scrolling symbol as each data entry in the list of data entries is scrolled through and the scroll is positioned on the data entry.

12. The method for providing a visual scrollbar position of claim 7, wherein;

while the scrolling capability is activated, the data in the selected data field of each data entry in the list of data entries is displayed as a display symbol replacing the scrolling symbol as each data entry in the list of data entries is scrolled through and the scroll is positioned on the data entry.

13. A system for providing a visual scrollbar position comprising:

a computing system implemented data management system;

data organized by the computing system implemented data management system into a list of data entries such that each data entry in the list of data entries includes at least two data fields containing data, the at least two data fields respectively including one or more data fields including color coding data based on the data in one or more of the at least two data fields, and audio tones data based on the data in one or more of the at least two data fields;

a display device associated with a computing system;

a user interface display displayed on the display device, the interface display including a display of the list of data entries;

a scrolling capability whereby a user can scroll through the list of data entries displayed in the user interface display;

a scrolling symbol for activation of the scrolling capability, the scrolling symbol being displayed in the user interface display;

a user interface device for activating the scrolling capability via the scrolling symbol; and one or more processors associated with one of more computing systems, the one or more processors executing instructions for implementing a process for providing a visual scrollbar position, the process for providing a visual scrollbar position comprising:

selecting, through a combination of analysis by the process and also interactions by a party through a user interface, from the display of the list of data entries, one or more of the at least one data fields of each data entry in the list of data entries as a display data field, the selected display data fields at least including a data field having at least one of color coding data and audio tones data, wherein the analysis by the process selects a display data field at least partly based on the type of data in the at least two display fields;

using the user interface device to activate the scrolling capability via the scrolling symbol; and while the scrolling capability is activated, displaying, in the user interface display, the data in the selected data field of each data entry in the list of data entries as each data entry in the list of data entries is scrolled through and the scroll is positioned on the data entry.

14. The system for providing a visual scrollbar position of claim 13, wherein;

the computing system implemented data management system is a computing system implemented financial management system.

15. The system for providing a visual scrollbar position of claim 13, wherein;

the computing system implemented data management system organizes data into a list of data entries such that each data entry in the list of data entries includes a primary sort data field containing primary sort data and the primary sort data field is selected as a display data field.

16. The system for providing a visual scrollbar position of claim 13, wherein;

the computing system implemented data management system organizes data into a list of data entries such that each data entry in the list of data entries includes a primary sort data field containing primary sort data and a secondary sort data field containing secondary sort data and the primary sort data field and secondary sort data field are selected as display data fields.

17. The system for providing a visual scrollbar position of claim 13, wherein;

while the scrolling capability is activated, the data in the selected data field of each data entry in the list of data entries is displayed in a display window associated with the scrolling symbol as each data entry in the list of data entries is scrolled through and the scroll is positioned on the data entry.

18. The system for providing a visual scrollbar position of claim 13, wherein;

while the scrolling capability is activated, the data in the selected data field of each data entry in the list of data entries is displayed as a display symbol replacing the scrolling symbol as each data entry in the list of data entries is scrolled through and the scroll is positioned on the data entry.

19. The computing system implemented process for providing a visual scrollbar position of claim 1 further comprising:

wherein the at least two data fields containing data include a primary sort field and a secondary sort field and those primary and secondary sort fields are selected by a party as display fields; and a display window within the user interface, the display window being adjacent to the scrolling symbol and separate from the display of the list of data entries, the display window having displayed therein at least a portion of data taken from individual ones of the primary and secondary sort fields, wherein data displayed in the display window changes as data entries in the list of data entries is scrolled through.

\* \* \* \* \*